(12) United States Patent
Chinn et al.

(10) Patent No.: US 9,197,805 B2
(45) Date of Patent: Nov. 24, 2015

(54) DIGITAL MULTIPLEXING READOUT FOR SPARSE SIGNALS ON IMAGING ARRAYS

(71) Applicant: The Board of Trustees of the Leland Stanford Junior University, Palo Alto, CA (US)

(72) Inventors: Garry Chinn, San Mateo, CA (US); Peter D. Olcott, Los Gatos, CA (US); Craig Steven Levin, Palo Alto, CA (US); Ewout Van Den Berg, Bronxville, NY (US); Carlos Alberto Sing-Long Collao, Stanford, CA (US); Emmanuel J. Candes, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 0 days.

(21) Appl. No.: 14/178,057

(22) Filed: Feb. 11, 2014

(65) Prior Publication Data
US 2014/0226043 A1    Aug. 14, 2014

Related U.S. Application Data

(60) Provisional application No. 61/763,322, filed on Feb. 11, 2013.

(51) Int. Cl.
| | |
|---|---|
| *H04N 5/225* | (2006.01) |
| *H04N 5/232* | (2006.01) |
| *G01T 1/29* | (2006.01) |
| *G04F 10/00* | (2006.01) |

(52) U.S. Cl.
CPC ............ *H04N 5/2258* (2013.01); *G01T 1/2985* (2013.01); *H04N 5/23206* (2013.01); *G04F 10/005* (2013.01)

(58) Field of Classification Search
CPC .......................... H04N 5/2258; H04N 5/23206
USPC .......................................... 348/294, 302, 308
See application file for complete search history.

(56) References Cited

U.S. PATENT DOCUMENTS

| | | | |
|---|---|---|---|
| 7,769,782 B1 * | 8/2010 | Gilbert et al. ................. 707/791 |
| 2007/0187596 A1 * | 8/2007 | Frisch et al. .................. 250/309 |
| 2011/0292265 A1 * | 12/2011 | Takahashi et al. ............ 348/308 |
| 2012/0043456 A1 * | 2/2012 | Hagihara ................... 250/208.1 |
| 2012/0175500 A1 * | 7/2012 | Saito .......................... 250/208.1 |
| 2014/0036122 A1 * | 2/2014 | Hagihara ..................... 348/302 |

* cited by examiner

*Primary Examiner* — Gevell Selby
(74) *Attorney, Agent, or Firm* — Beyer Law Group LLP (57) ABSTRACT

A method for providing an image from a device with a plurality of sensors and a plurality of time to digital converters (TDC) is provided. Data signals are generated by some of the plurality of sensors, wherein each sensor of the plurality of sensors provides output in parallel to more than one TDC of the plurality of TDCs and wherein each TDC of the plurality of TDCs receives in parallel input from more than one sensor of the plurality of sensors and where a binary matrix indicates which sensors are connected to which TDC. The data signals are transmitted from the sensors to the TDCs. TDC signals are generated from the data signals. Group testing is used to decode the TDC signals based on the binary matrix.

19 Claims, 7 Drawing Sheets

DIGITAL MULTIPLEXING READOUT FOR SPARSE SIGNALS ON IMAGING ARRAYS

CROSS REFERENCE TO RELATED APPLICATIONS

This application claims priority under 35 U.S.C. §119 from U.S. Provisional Patent Application No. 61/763,322, filed Feb. 11, 2013, entitled DIGITAL MULTIPLEXING READOUT FOR SPARSE SIGNALS ON IMAGING ARRAYS, which is incorporated herein by reference for all purposes.

GOVERNMENT RIGHTS

This invention was made with Government support under contract N00014-10-1-0599 awarded by the Department of the Navy ONR. The Government has certain rights in the invention.

BACKGROUND OF THE INVENTION

This invention relates generally to photon detection. Such photon detection is used in positron emission tomography (PET) and other systems.

Advances in solid-state technology have enabled the development of silicon photomultiplier sensor arrays capable of sensing individual photons. Combined with high-frequency time-to digital converters (TDCs), this technology opens up the prospect of sensors capable of recording with high accuracy both the time and location of each detected photon. Such a capability could lead to significant improvements in imaging accuracy, especially for applications operating with low photon fluxes such as LiDAR and positron emission tomography.

SUMMARY OF THE INVENTION

In a manifestation of the invention, a method for providing an image from a device with a plurality of sensors and a plurality of time to digital converters (TDC) is provided. Data signals are generated by some of the plurality of sensors, wherein each sensor of the plurality of sensors provides output in parallel to more than one TDC of the plurality of TDCs and wherein each TDC of the plurality of TDCs receives in parallel input from more than one sensor of the plurality of sensors and where a binary matrix indicates which sensors are connected to which TDC. The data signals are transmitted from the sensors to the TDCs. TDC signals are generated from the data signals. Group testing is used to decode the TDC signals based on the binary matrix.

In another manifestation of the invention, an apparatus is provided. A plurality of sensors is provided in an m×n array where m and n are whole numbers greater than 1. A plurality of time to digital converters (TDC) is provided, where there are less than m+n TDC's, and where each TDC is connected in parallel to receive a signal from more than one sensor of the plurality of sensor and where more than one TDC receives a signal from each sensor of the plurality of sensors. A controller is electrically connected to each TDC of the plurality of TDC's. The controller comprises at least one processor; and computer readable media, comprising computer readable code for using group testing to decode the data signals from a plurality of sensors.

The invention and objects and features thereof will be more readily apparent from the following detailed description and appended claims when taken with the drawings.

DETAILED DESCRIPTION OF ILLUSTRATED EMBODIMENTS

The demands placed on on-chip readout circuitry imposes stringent trade-offs between fill factor and spatio-temporal resolution, causing many contemporary designs to severely under-utilize the technology's full potential. Concentrating on the low photon flux setting, embodiments of the invention leverage results from group testing and provide an architecture for a highly efficient readout of pixels using only a small number of TDCs, thereby also reducing both cost and power consumption. The embodiments rely on a multiplexing technique based on binary interconnection matrices. Some embodiments provide optimized instances of these matrices for various sensor parameters and give explicit upper and lower bounds on the number of TDCs required to uniquely decode a given maximum number of simultaneous photon arrivals.

Photon detection has become an essential measurement technique in science and engineering. Indeed, applications such as positron emission tomography (PET), single-photon emission computed tomography, flow cytometry, LiDAR, fluorescence detection, confocal microscopy, and radiation detection all rely on accurate measurement of photon fluxes. Traditionally, the preferred measurement device has been the photomultiplier tube (PMT), which is a high-gain, low-noise photon detector with a high-frequency response and a large area of collection. In particular, it behaves as an ideal current generator for steady photon fluxes, making it suitable for use in applications in astronomy and medical imaging, among others. However, they are bulky, require manual assembly steps, and have limited spatial resolution. For these reasons, extensive research has focused on finding feasible solid-state alternatives that can operate at much lower voltages, are immune to magnetic effects, have increased efficiency, and are smaller in physical size. Recent designs have raised significant interest in the community, and their use as a replacement for PMTs in applications such as PET imaging, high-energy physics, astrophysics, LiDAR, and flow cytometry has been recently explored.

Silicon photomultiplier (SiPM) devices consist of two-dimensional arrays of Geiger avalanche photodiodes (APD) that are run above their breakdown voltage and are integrated with either an active or passive quenching circuit. Devices built up from these Geiger APD microcells are characterized by the fraction of sensing area on the device (the fill factor), and the fraction of incident photons that cause charged APDs to fire (the detection quantum efficiency). The product of these two quantities gives the combined photon detection efficiency (PDE).

The compatibility of Geiger APDs with standard CMOS technology has enabled a number of different designs. For example, the digital silicon photomultiplier (DSiPM) adds processing circuitry to count the total number of photons hitting the sensor and records the time stamp of the first group of photons that crosses a predetermined photon intensity threshold. The resolution of the resulting sensor coincides with the size of the entire sensor (usually 3 mm×3 mm in area) whereas the temporal sampling is limited to a single time stamp per pulse. Nevertheless, the sensor does achieve a very high fill factor (80%) and is, therefore, very sensitive. Note that in SiPM terminology, the above tiling of microcells into larger atomic units is often referred to as a pixel. Throughout this specification, however, the term "pixel" is used to refer to individual Geiger APD microcells, since they represent the smallest resolvable element in our proposed design.

An alternative sensor design, called SPAD, aims at a high temporal resolution and registers the time of each pixel (APD) firing. This is achieved by connecting each pixel to a high-performance time-to-digital converter (TDC), which records a time stamp in a memory buffer whenever a signal is detected on its input. Because of their relatively low complexity, especially when compared to analog-to-digital converters, TDCs allow the sensor to achieve an extremely high temporal resolution. However, the spatial resolution of the sensor is severely compromised by the large amount of support circuitry between neighboring pixels, resulting in an extremely low fill factor of approximately 1-5%.

Although promising, both designs show that current implementations highly underutilize the full potential of these silicon devices: due to the restricted chip area a trade-off must be made between the spatio-temporal resolution and the fill factor. In order to improve this trade-off, an embodiment of the invention takes advantage of the special properties present in settings with a low photon flux. In particular, by taking advantage of the temporal sparsity of the photon arrivals, this embodiment can increase the spatio-temporal resolution of the SiPM to within a fraction of the theoretical maximum while maintaining simple circuitry and a high fill factor.

Figure 1:
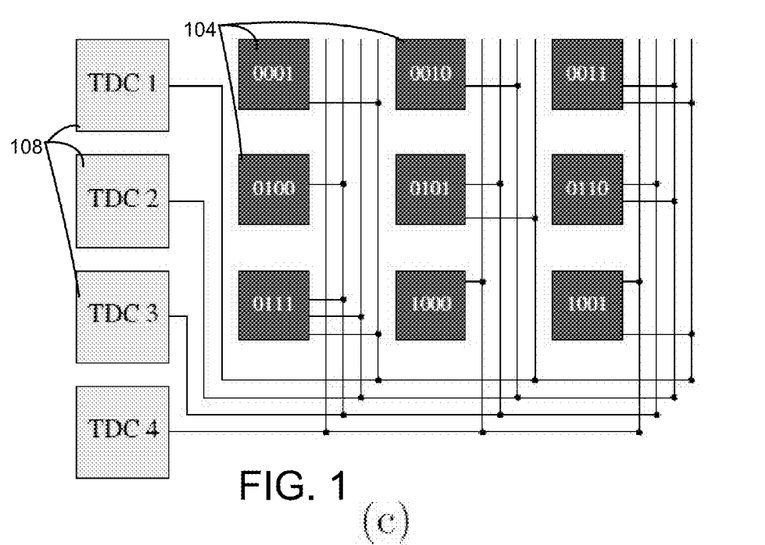
FIGS. 1a-c shows three SiPM designs.
Figure 1A:
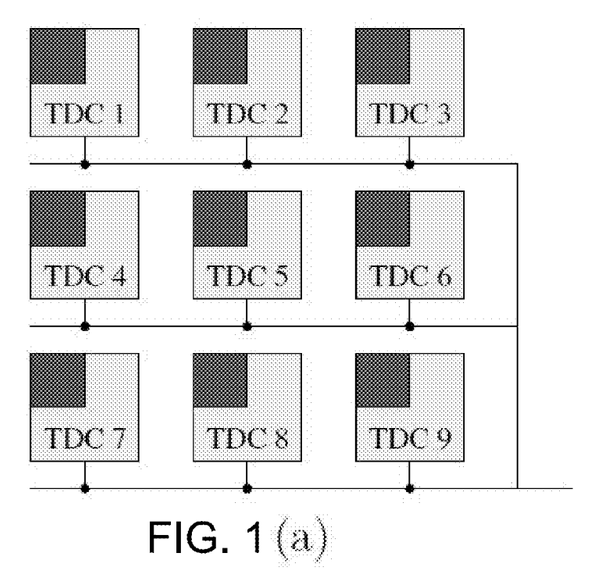
Figure 1B:
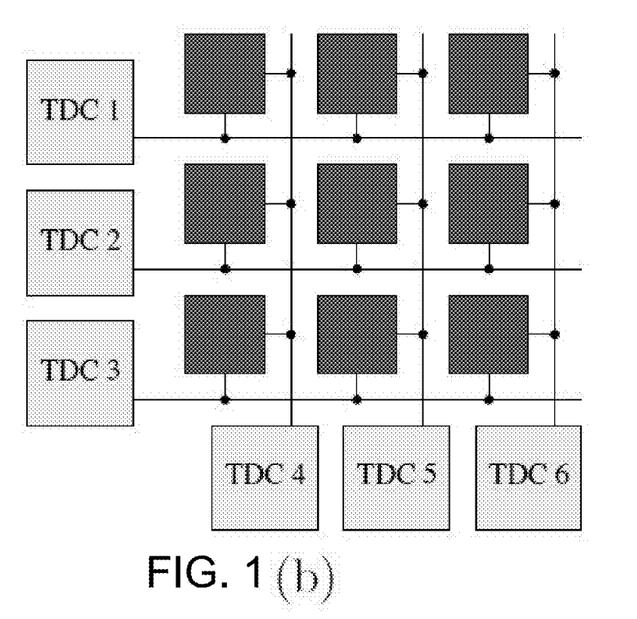

This claim is made possible by the combination of two ideas: (1) to use TDCs as the main readout devices, and (2) to exploit ideas from group testing to reduce the number of these devices. As a motivational example, consider three possible designs for an m×m pixel grid. FIGS. 1a-c shows three SiPM designs. The first design, illustrated in FIG. 1a corresponds to a design with a single TDC per pixel. This design can be seen as a trivial group test capable of detecting an arbitrary number of simultaneous firings, but at the cost of $m^2$ TDCs. When the photon flux is low, only a small number of pixels will typically fire at the same time, thus causing most TDCs to be idle most of the time, and resulting in a very poor usage of resources. The second design, shown in FIG. 1b, corresponds to the widely-used cross-strip architecture in which rows and columns of pixels are each aggregated into a single signal. This design requires only 2 m TDCs, but information from the TDCs can only be uniquely decoded if no more than one pixel fired during the same time interval. Hinting at the power of more efficient group-testing designs, FIG. 1c shows a design in which pixels are numbered from 1 to $m^2$ and in which a pixel i is connected to TDC j only if the j-th bit in the binary representation number i is one. This design is also capable of decoding up to a single pixel firing, but requires only $\lfloor \log_2 2m \rfloor$ TDCs. Whenever the number of simultaneous firings is small, a significant reduction in the number of TDCs (and accompanying memory buffers) can be attained by carefully selected designs, which reduce both the amount of overhead circuitry and the generated volume of data.

Group Testing

Group testing was proposed in R. Dorfman, "The detection of defective members of large populations," *The Annals of Mathematical Statistics*, 14(4):436-440, 1943, to effectively screen large numbers of blood samples for rare diseases. Instead of testing each sample individually, carefully chosen subsets of samples are pooled together and tested as a whole. If the test is negative, it is known that none of the samples in the pool is positive, saving a potentially large number of tests. Otherwise, one or more samples are positive and additional tests are needed to determine exactly which ones.

Since its introduction, group testing has been used in a variety of different applications including quality control and product testing, pattern matching, DNA library screening, multi-access communication, tracking of hot items in databases and many others. Depending on the application, group testing can be applied in an adaptive fashion in which tests are designed based on the outcome of previous tests, and in a nonadaptive fashion in which the tests are fixed a priori. Additional variations include schemes that provide robustness against test errors, or the presence of inhibitors, which cause false positives and negatives, respectively.

In a SiPM application in an embodiment, each pixel fires independently according to some Poisson process, and exactly fits in the probabilistic group-testing model.

Nevertheless, since guaranteeing performance up to a certain level of simultaneous firings is desirable, the application will be studied from a combinatorial group-testing perspective. Furthermore, measurements are necessarily nonadaptive as they are hardwired in the actual implementation. No error correction is needed; the only errors we can expect are spurious pixel firings (dark counts) or after pulses, but these appear indistinguishable from real firings, and cannot be corrected for. The rate of these spurious pixel firings is usually much less than the signal rate, especially in our scintillation example.

Matrix Representation and Guarantees

A group test can be represented as a binary t×n incidence matrix or code A with t the length or number of tests and n the size or number of items, or pixels in our case. An entry $A_{i,j}$ is set to one if item j is pooled in test i, that is, if pixel j is connected to TDC i, and zero otherwise. Given a vector x of length n with $x_j=1$ if item j is positive and zero otherwise, we can define the test vector y as y=Ax, where multiplication and addition are defined as logic AND and OR, respectively. The columns $a_j$ in A are called codewords, and for sake of convenience we allow set operations to be applied to these binary codewords, acting on or defining their support. As an illustration of the above, consider the following example:

$$\begin{pmatrix} 1 \\ 1 \\ 0 \end{pmatrix} = \begin{pmatrix} 1 & 2 & 3 & 4 & 5 \\ 1 & 0 & 0 & 1 & 1 \\ 0 & 1 & 0 & 1 & 0 \\ 1 & 0 & 1 & 0 & 0 \end{pmatrix} \begin{pmatrix} 0 \\ 1 \\ 0 \\ 1 \\ 0 \end{pmatrix}$$

$$y = Ax$$

In this example pixels 1, 4, and 5 are connected to the first TDC, as represented by the first row of A. When pixels 2 and 4 fire, the corresponding columns are summed, and it is found that the first and second TDCs are activated, as indicated by y.

For group testing to be effective, it is desirable to have far fewer tests than items (t<<n). This inherently means that not all vectors x can be reconstructed from y, so we will be interested in conditions that guarantee recovery when x has up to d positive entries.

The weakest notion for recovery is d-separability, which means that no combination of exactly d codewords can be expressed using any other combination of d codewords. A matrix is said to be d⁻-separable if the combination of any up to d codewords is unique. This immediately gives an information-theoretic lower bound on the length t:

$$t \geq \log_2\left(\sum_{i=0}^{d} \binom{n}{i}\right) \quad (1)$$

When d is small compared to n, this gives $t \approx d \log_2(n/d)$. A stronger criteria is given by d-disjunctness. Given any two codewords u and v, we say that u covers v if $u \cup v = u$. Based on this, define A to be d-disjunct if no codeword in A is covered by the union of any d others. The concept of disjunctness of sets and codes has been proposed in a number of settings and such codes are also known as superimposed codes, or d-cover free families. The advantage of d-disjunct codes is that the positive entries in any d-sparse vector x correspond exactly to those codewords in A that remain after discarding all codewords that have a one in a position where y is zero. This is unlike general separable matrices, where a combinatorial search may be needed for the decoding.

The central goal in group testing is to determine the smallest length t for which a matrix of size n can satisfy certain separability or disjunctness properties. Denote by S(n, d) and D(n, d) the set of all t×n matrices A that are d-separable, respectively d-disjunct. Then we can define TS (n, d) the smallest length of any $A \in S(n, d)$, and likewise for TD (n, d). As a further refinement in classification we define $D_w$(n, d) as all constant-weight d-disjunct matrices of size n, i.e., those matrices whose columns all have the same weight or number of nonzero entries (note that the weights of any two matrices within this class can differ). The overlap between any two columns $a_i$ and $a_j$ of a code is defined as $|a_i \cap a_j|$. Consider a constant-weight w code A with maximum pairwise overlap $$\mu = \mu(A) := \max_{i \neq j} |a_i \cap a_j|.$$

It is easily seen that it takes $\lfloor w/\mu \rfloor$ columns to cover another one, and therefore that $$d \geq \left\lfloor \frac{w-1}{\mu} \right\rfloor \quad (2)$$

We can then define $D_{w,\mu}$(n, d) as the class of constant-weight codes of size n where the right-hand side of (2) equals d. As for all other classes, the actual disjunctness of the codes in $D_{w,\mu}$ may still be higher, however, there is a subtle distinction in parameterization here in that, by definition, we have $D_{w,\mu}$(n, d+1) $\cap$ $D_{w,\mu}$(n, d)=∅, whereas $D_w$(n, d+1) ⊂ $D_w$(n, d), and likewise for D and S. Summarizing, we have $$D_{w,\mu}(n, d) \subseteq D_w(n, d) \subseteq D(n, d) \subseteq S(n, d),$$

along with the associated minimum lengths T (n, d).

Matrix Construction

Examples of embodiments of the invention may use one of three methods for creating d-disjunct binary matrices. Examples of embodiments constructs matrices for the particular case where n=3,600, corresponding to a 60×60 pixel array.

Greedy Approach

The greedy approach generates d-disjunct matrices one column at a time. For the construction of a constant-weight w matrix of length t the algorithms starts with F=∅, and proceeds by repeatedly drawing, uniformly at random, an element F from ([t]) as a candidate column. Whenever the distance to all sets already in F exceeds w/d we add F to F and continue the algorithm with the updated family. This process continues until either |F|=n or a given amount of time has passed.

An embodiment applied the greedy algorithm to construct d-disjunct matrices of size at least 3,600. For each value of d and length t, the algorithm was allowed to run for 12 hours. Row (1) of Table 3 gives the minimum t for which the algorithm found a solution. Instances with fewer rows are very well possible; this strongly depends both on the choice of the initial few columns and the amount of time available.

A further reduction in the code length could be achieved by checking disjunctness in a groupwise, rather than a pairwise setting. However, the number of possible d-subsets of columns to consider at each iteration grows exponentially in d, thereby rendering this approach intractable for even moderate values of d.

Chinese Remainder Sieve

D. Eppstein, M. T. Goodrich, and D. S. Hirschberg in "Improved combinatorial group testing algorithms for real-world problem sizes," SIAM *Journal on Computing,* 36(5): 1360-1375, 2007 discusses the 'Chinese remainder sieve', a number-theoretic method for the deterministic construction of d-disjunct matrices. In order to generate a d-disjunct matrix with at least n columns, first choose a sequence $\{p_1^{e_1}, p_2^{e_2}, \ldots, p_k^{e_k}\}$ of powers of distinct primes such that $\Pi_{i=1}^{k} p_i^{e_i} \geq n^d$. A t×n matrix A with $t = \Pi_{i=1}^{k} p_i^{e_i}$ is then created by vertical concatenation of $p_l^{e_l} \times n$ matrices $A_l$ as follows:

$$A = \begin{bmatrix} A_1 \\ A_2 \\ \vdots \\ A_k \end{bmatrix},$$

$$A_l(i, j) = \begin{cases} 1 & i \equiv j \bmod p_l^{e_l} \\ 0 & \text{otherwise.} \end{cases}$$

As an example, consider the construction of a 1-disjunct 5×6 matrix generated based on p1=2 and p2=3. Applying the above definition we obtain:

$$A = \begin{bmatrix} A_1 \\ \hline A_2 \end{bmatrix} = \begin{bmatrix} 1 & 0 & 1 & 0 & 1 & 0 \\ 0 & 1 & 0 & 1 & 0 & 1 \\ \hline 1 & 0 & 0 & 1 & 0 & 0 \\ 0 & 1 & 0 & 0 & 1 & 0 \\ 0 & 0 & 1 & 0 & 0 & 1 \end{bmatrix}$$

The above construction requires $t = O(d^2 \log^2 n/(\log d + \log \log n))$ rows for a d-disjunct matrix of size n. This is only slightly worse than the best-known $O(d^2 \log n)$ construction, which we discuss in more detail below. Using a near-exhaustive search over prime-power combinations, we construct d-disjunct matrices of size at least 3,600. The parameters giving designs with the smallest number of rows are given in Table 1.

TABLE 1

Prime powers used for the construction of d-disjunct t × n.

| d | t | n | prime powers |
|---|---|---|---|
| 2 | 82 | 4077 | $\{2^3, 3^2, 5, 7, 11, 13, 17, 23\}$ |
| 3 | 155 | 3855 | $\{2^2, 3, 5, 7, 11, 13, 17, 19, 23, 29, 37\}$ |
| 4 | 237 | 3631 | $\{2^3, 3, 5, 7, 11, 13, 17, 19, 23, 29, 31, 37, 43\}$ |
| 5 | 333 | 4023 | $\{2^3, 3^2, 5, 7, 11, 13, 17, 19, 23, 29, 31, 37, 41, 43, 53\}$ |
| 6 | 445 | 4077 | $\{2^3, 3^2, 5, 7, 11, 13, 17, 19, 23, 29, 31, 37, 41, 43, 53, 61\}$ |

Designs Based on Error-correcting Codes

Excellent practical superimposed codes can be constructed based on error-correcting codes. Here, we discuss a number of techniques and constructions we used to generate the best superimposed codes known to us for a variety of pixel array sizes (i.e., for square m×m arrays with m ∈ {10, 20, 30, 40, 60, 120}). For comparison with other constructions, the results are summarized in Table 2, and in row (n) of Table 3 for n=3,600.

Binary codes. The most straightforward way of obtaining d-disjunct superimposed codes is by simply taking constant-weight binary error-correction codes obeying (2), with overlap µ as given below. The on-line repository A. E. Brouwer, "Bounds for constant weight codes," available online at http://www.win.tue.nl/~aeb/codes/Andw.html lists the best known lower bound on maximum size A(n, d, w) for constant weight w codes of length n and Hamming distance d (note the different use of n and d in this context). Given a code ST(n,d,w) from this Standard Table, the overlap satisfies µ≤w−d/2. Some codes are given explicitly, whereas others require some more work to instantiate. We discuss two of the most common constructions that are used to instantiate all but one of the remaining codes we use. The first construction consists of a short list of seed codewords $v_i$, along with a number of cyclic permutations. These permutations give rise to a permutation group P and the words in the final code are those in the union of orbits of the seed vectors: $\cup_i \{w|w=P(v_i), P \in P\}$. The second construction shortens existing codes in one of two ways. We illustrate them based on the generation of the 2-disjunct code st(21,8,7) of size 100 from st(24,8,8). The first type of shortening consists of identifying a row i with the most ones and then selecting all columns incident to this row and deleting row i. This both reduces the weight and the length of the code by one, but preserves the distance, and in this case gives st(23,8,7) (note that shortenings do not in general lead to new optimal or best known codes). The second type of shortening identifies a row i with the most zero entries and creates a new code by keeping only the columns with a zero in the i-th row, and then removing the row. This construction does not affect the weight of the matrix, only the size and length. Repeating this twice from st(23,8,7) yields the desired st(21,8,7) code. Note that for constant-weight codes, the minimum number of ones in any given row is bounded above by $\lfloor wn/t \rfloor$. This expression can be used to give a theoretical minimum on the number of rows by which we can shorten a code. In practice it may be possible to remove a substantially larger number of rows. Below we will frequently use shortening to obtain codes with smaller length. In these cases we only use the second type of shortening, based on zero entries.

q-ary error-correction codes. The Standard Table only lists codes with relatively small lengths and consequently, limited sizes. In order to construct larger or heavier codes we apply a construction based on (maximal distance separable (MDS)) q-ary error-correcting codes, as proposed by W. H. Kautz and R. C. Singleton in "Nonrandom binary superimposed codes," *IEEE Transactions on Information Theory*, 10(4):363-377, October 1964. Let $(n, k, d)_q$ denote a linear q-ary code of length n, size $q^k$, and Hamming distance d. Each codeword in these codes consists of n elements taken from GF(q) and differs in at least d locations from all other codewords. A binary superimposed code can be obtained from these q-ary codes by replacing each element with a corresponding column of a q×q identity matrix Iq. That is, we map each element in GF(q) to a unique column of $I_q$. For example, we map value k to the (k+1)-st column of $I_q$ as follows:

| q-ary | | 2 | 0 | 1 | 2 | 1 | 1 | 0 |
|---|---|---|---|---|---|---|---|---|
| binary | 0 | 0 | 1 | 0 | 0 | 0 | 0 | 1 |
| | 1 | 0 | 0 | 1 | 0 | 1 | 1 | 0 |
| | 2 | 1 | 0 | 0 | 1 | 0 | 0 | 0 |

The overlap between any two codewords of the resulting concatenated code is bounded by the length of the code n minus the distance d. Meanwhile, the weight is exactly the length. The disjunctness of the resulting code is therefore at least $\lceil (n-1)/(n-d) \rceil$. As an aside, note that this construction requires an explicit set of codewords. This can be contrasted with q-ary error-correction codes, for which fast encoding-decoding algorithms often exist, and which do not require such an explicit representation.

Existence of a large class of $(n, k, d)_q$ codes, including the well-known Reed-Solomon codes are known. F. J. MacWilliams and N. J. A. Sloane, in "*The Theory of Error-Correcting Codes,*" North-Holland Publishing Company, Amsterdam, 1977. (3rd printing, 1983) discloses that cyclic MDS codes with n=q+1 and d=q−k+2 are shown to exist whenever 1≤k≤q+1 and q is a prime power. As a result, it can be concluded that, when expressed in group-testing notation, this concatenated code construction requires a length t=O(min[n, $k^2 \log^2 n$]), compared to the best-known bound of $O(k^2 \log n)$. Despite the slightly weaker bound, we shall see below that for small instances, the resulting codes are far superior to the random constructions used to yield the improved bound.

As an example, we used a concatenation of $(10, 4, 7)_{11}$ with $I_{11}$, denoted $(10, 4, 7)_{11}^{I_q}$, to construct the 3-disjunct matrix of size n=14,400 shown in Table 2. Most of the other codes obtained using this construction have an additional superscript s(k) to indicate the application of k shortening steps. The 4-disjunct code of length n=1,600 also has a superscript x to indicate extension of the code. In this case, the four shortening steps resulted in a 113×1,596 code, falling just short of the desired size of 1,600. The very structured nature of these concatenated codes means that many constant-weight vectors are not included, even if they may be feasible. We can therefore try to apply greedy search techniques to augment the code. For this particular case it was found to be relatively easy to add several columns, thus resulting in a code of desired size.

All of the q-ary codes appearing in Table 2 are Reed-Solomon codes, except for $(10, 4, 7)_9$, which is a constacyclic linear code whose construction is given by M. Grassl. Bounds, in "On the minimum distance of linear codes and quantum codes," Available online at http://www.codetables.de, 2007.

Figure 2:
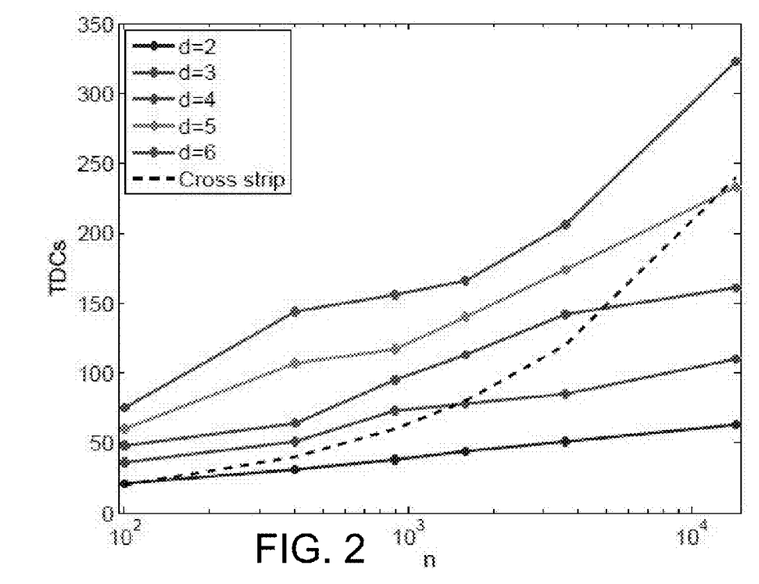
FIG. 2 shows comparisons between the number of TDCs used for the best-known codes in Table 2 and a standard cross-strip design, for different numbers of pixels n.

FIG. 2 shows comparisons between the number of TDCs used for the best-known codes in Table 2 and a standard cross-strip design, for different numbers of pixels n. The cross-strip design connects each row and column to a single TDC, giving a d=1 disjunct encoding. The number of TDCs in the cross-strip design grows as $O(\sqrt{n})$, much faster than the $O(d^2 \log n)$ in group-testing matrices.

TABLE 2

| | n = 100 | | n = 400 | | n = 900 | |
|---|---|---|---|---|---|---|
| d | t | construction | t | construction | t | construction |
| 2 | 21 | st(21, 8, 7) | 31 | st(31, 8, 7) | 38 | st(38, 8, 7) |
| 3 | 36 | st(36, 10, 7) | 51 | st(51, 10, 7) | 73 | $(7, 3, 5)_{11}^{Iq,s(4)}$ |
| 4 | 48 | st(48, 8, 5) | 64 | $c(65, 9, 3)^{s(1)}$ | 95 | $(9, 3, 7)_{11}^{Iq,s(4)}$ |
| 5 | 60 | st(60, 10, 6) | 107 | $(11, 3, 9)_{11}^{Iq,s(14)}$ | 117 | $(11, 3, 9)_{11}^{Iq,s(4)}$ |
| 6 | 75 | $(7, 2, 6)_{11}^{Iq,s(2)}$ | 144 | $(13, 3, 11)_{11}^{Iq,s(25)}$ | 156 | $(13, 3, 11)_{13}^{Iq,s(13)}$ |
| | n = 1,600 | | n = 3,600 | | n = 14,400 | |
| d | t | construction | t | construction | t | construction |
| 2 | 44 | st(44, 8, 7) | 51 | st(51, 8, 7) | 63 | $(7, 4, 4)_{11}^{st(9,4,3)}$ |
| 3 | 78 | $(10, 4, 7)_9^{Iq,s(12)}$ | 85 | $(10, 4, 7)_9^{Iq,s(5)}$ | 110 | $(10, 4, 7)_{11}^{Iq}$ |
| 4 | 113 | $(9, 3, 7)_{13}^{Iq,s(4),x}$ | 142 | $(9, 3, 7)_{16}^{Iq,s(2)}$ | 161 | $(13, 4, 10)_{13}^{Iq,s(8)}$ |
| 5 | 140 | $(11, 3, 9)_{13}^{Iq,s(3)}$ | 174 | $(11, 3, 9)_{16}^{Iq,s(2)}$ | 233 | $(16, 4, 13)_{16}^{Iq,s(23)}$ |
| 6 | 166 | $(13, 3, 11)_{13}^{Iq,s(3)}$ | 206 | $(13, 3, 11)_{16}^{Iq,s(2)}$ | 323 | $(13, 3, 11)_{25}^{Iq,s(2)}$ |

General concatenated codes. It is possible to replace the trivial identity code by arbitrary d-disjunct binary matrices in forming concatenated codes, provided that the size of the matrix is at least q. An embodiment of the invention found that the concatenation of the $(7, 4, 4)_{11}$ code with st(9,4,3) yielded our smallest 2-disjunct code of size 14,400. Likewise a 2-disjunct 51×4,489 matrix can be obtained by concatenating $(3, 2, 2)_{67}$ with st(17,6,5). The code given in Table 2 lists instead st(51,8,7), which yields a slightly smaller code with weight 7 instead of 15. Note that concatenation with non-trivial disjunct matrices can result in codes in $D_w (d, n) \backslash D_{w,\mu} (d, n)$ or even $D(d, n) \backslash D_w(d, n)$.

Other constructions. Other examples of embodiments may use two other construction techniques to generate superimposed codes. The first technique is based on certain designs such as t-designs and Steiner systems, which were used for example to construct a 4-disjunct 65×520 binary code. The matrix corresponding to this particular system can be found on-line in the La Jolla Covering Repository D. Gordon et al. La Jolla Covering Repository, available online at http://www.ccrwest.org/cover.html as C (65, 9, 3). In Table 2 we shorten this matrix by a single row to obtain a code for n=400. Although this construction is significantly shorter than the best q-ary based design, we could find (a 76×408 shortening of $(9, 3, 7)_9$), it is typically much harder to obtain explicit instantiations of designs, or even to show their existence, at least compared to q-ary codes. The second technique based on Latin squares appears was used by A. G. D'yachkov, A. J. Macula, and V. V. Rykov in "New constructions of superimposed codes," *IEEE Transactions on Information Theory*, 46:284-290, 2000 to create 2-disjunct 51×4,624 and 63×14,400 matrices.

Theoretical Bounds

We now summarize an extensive literature concerning theoretical bounds on the minimum number of pools required for a group-testing design of size n to be d-disjunct. These results include both upper and lower bounds on this minimum, and can be used to get an idea about the quality of the matrices we constructed in the previous section.

Asymptotic Bounds

Bounds on the growth rate of $T_D (n, d)$ have been discovered and rediscovered in different contexts in information theory, combinatorics, and group testing. In the context of superimposed codes, A. G. D'yachkov and V. V. Rykov in "A survey of superimposed code theory," *Problems of Control and Information Theory*, 14:1-13, 1983 obtained the following bounds:

$$\Omega(d^2 \log n/\log d) \leq T_D(n, d) \leq O(d^2 \log n).$$

M. Ruszinkó in "On the upper bound of the size of the r-cover-free families" *Journal of Combinatorial Theory, Series A*, 66:302-310, 1994 and Z. Füredi in "On r-cover-free families" *Journal of Combinatorial Theory, Series A*, 73:172-173, 1996 give an interesting account on the lower bound and provide simpler proofs. The lower bound was also obtained for sufficiently large d with $d \leq n^{1/3}$ the context of d-cover free systems for system complexity, which was extended to the general case.

For the upper bound, it follows from the analysis of a greedy-type construction given by F. K. Hwang and V. T. Sós in "Non adaptive hypergeometric group testing" *Studia Sci. Math. Hungarica*, 22:257-263, 1987, that for $t \geq 16 d^2$ we have $$TD_{w,\mu}(n, d) \leq 16 \, d^2 \log_3(2)(\log_2(n)-1) < 11 \, d^2 \log_2(n). \quad (3)$$

An efficient polynomial-time algorithm for generating similar constant-weight d-disjunct t×n matrices with $t=O(d^2 \log n)$ was given by E. Porat and A. Rothschild in "Explicit non-adaptive combinatorial group testing schemes."

Non-asymptotic Results

When working with particular values of d and n, constants in theoretic bounds become crucial. Most theoretical results, however, are concerned with growth rates and even if explicit constants are given, they may be too loose to be of practical use.

In this section we are interested in the code length t required to guarantee the unique recovery of up to d=6 simultaneous firings on a 60×60 pixel array, that is n=3,600. We do this by studying the various models used to obtain upper and lower bounds on T (n, d) and numerically evaluating the original expressions, instead of bounding them. By optimizing over parameters such as weight or matrix size, we obtain the best numerical values for the bounds, as permitted by the different models. These will be used as a reference point to evaluate the quality of the codes given in Table 2.

All bounds are evaluated using Sage and summarized in Table 3 for d=2, . . . , 6. We omit results for d=1, which only requires the columns of the matrix to be unique.

Upper Bounds on T (n, d)

Sequential picking. The construction given by F. K. Hwang and V. T. Sós cited above for obtaining an upper bound on $TD_{w,\mu}(n, d)$ works as follows. Starting with a family of initially all good sets $$G_0 = \binom{\lfloor t \rfloor}{w}$$

of a fixed weight w we pick a random element $g \in G_0$. After we make this choice we determine the family $B_1$ of sets in $G_0$ whose overlap with g is w/d or more (this includes g itself). We then remove all the bad items $B_1$ from $G_0$ to get $G_1 = G_0 \backslash B_1$. We then repeat the procedure, picking at each point a g from $G_i$, determining $B_{i+1}$ and forming $G_{i+1}$, until $G_n$ is empty. We can then form a t×n matrix A with the support of each column corresponding to one of the selected g. This matrix will be d-disjunct since, by construction, it has constant column weight w and satisfies (2) with overlap μ<w/d. For the number of rows in A, notice that the size of each $B_i$ satisfies $$|B_i| \leq \sum_{i=\lceil w/d \rceil}^{w} \binom{w}{i}\binom{t-w}{w-i}$$

Because the size of the initial family $G_0$ was (t) we have that $$n \geq \binom{t}{w} \Big/ \sum_{i=\lceil w/d \rceil}^{w} \binom{w}{i}\binom{t-w}{w-i}. \tag{4}$$

This can be turned into the upper bound on $T_{D_{w,\mu}}(n, d)$ shown in (3) by following the parameter choice and analysis given in F. K. Hwang above. Entries (a-c) in Table 3 are obtained using respectively (3), the bound given in P. Erdös, P. Frankl, and Z. Füredi, in "Families of finite sets in which no set is covered by the union of r others" *Israel J. Math.*, 51:79-89, 1985 with optimal choice of w, and the smallest t that satisfies (4) for some w≤t.

Random ensemble. An alternative to picking compatible columns one at a time, is to draw an entire set of columns from a suitable distribution and check if the resulting matrix is indeed d-disjunct. An upper bound on the required number of rows is obtained by finding the smallest t such that the probability that the matrix does not satisfy d-disjunctness is strictly bounded above by one.

Consider a t×n matrix A with entries drawn i.i.d. from the Bernoulli distribution; each entry takes on the value 1 with probability β and the value 0 with probability 1−β. For any column in A, the probability that it is covered by d<n of the other columns is given by $$p = (1-\beta(1-\beta)^d)^t, \tag{5}$$

since each entry in the column is not covered by the union of the other d if and only if its value is 1, and the corresponding entries in the other d columns are all 0. Since we want to minimize the chance of overlap, we find the minimum with respect to β, giving β=1/(d+1). By taking a union bound over all possible sets, we can bound the probability that at least one column in A is covered by some d others as $$P(A \text{ not } d\text{-disjunct}) \leq n\binom{n-1}{d}p \tag{6}$$

This setup forms the basis for the analysis given by A. G. D'yachkov and V. V. Rykov in "A survey of superimposed code theory," *Problems of Control and Information Theory*, 14:1-13, 1983. In Table 3, row (d), we show the smallest t for which this probability is less than one; for the optimal β, this is given by $$t = \left\lceil 1 - \log\left(n\binom{n-1}{d}\right) \Big/ \log\left(1 - \left(1 - \frac{d^d}{(d+1)^{d+1}}\right)\right)\right\rceil$$

To construct matrices with constant-weight w, we can uniformly draw columns from $$S = \binom{\lfloor t \rfloor}{w}.$$

The probability that a fixed column is covered by d others can be evaluated as follows. Let $R_d(t, w, i)$ denote the number of ways we can cover a fixed set of w entries in a t-length vector with d columns, given that i entries have already been covered. With only a single column left, we first cover the remaining w−i entries, leaving i entries to be freely selected in the remaining t−(w−i) positions. This gives $$R_1(t, w, i) = \binom{t-w+i}{i}$$

For d>1 we can cover up to w−i entries and cover the others using the remaining d−1 columns. Therefore, $$R_d(t, w, i) = \sum_{j=0}^{w-i} \binom{w-i}{j}\binom{t-w+j}{w-j} R_{d-1}(t, w, i+j)$$

The probability that a column is covered by d others is then given by $$p = R_d(t, w, i) \Big/ \binom{t}{w}^d \tag{7}$$

and we can again use the union bound given by (6). In order to determine the smallest possible t we start at t=1 and double its value until the right-hand side of (6) is less than one and then use binary search to find the desired t. This is repeated for all suitable column weights w and row (e) of Table 3 lists the smallest value of t obtained using this procedure.

The use of the union bound in (6) ignores the fact that many of the columns and d-sets are independent. In order to obtain sharper bounds for a similar problem, we apply Local Lemma stated below and described below.

Lemma 3.1 (The Local Lemma; Symmetric case) Let $E_1, E_2, \ldots, E_n$ be events in an arbitrary probability space. Suppose that each event $E_i$ is independent of all other events $E_j$ except at most μ of them, and that $P(E_i) \leq p$ for all $1 \leq i \leq n$. If $$ep(\mu+1) \leq 1 \tag{8}$$

then $P(\cap_{i=1}^{n} \overline{E_i}) > 0$.

Working again with n columns drawn uniformly and independently from $$\binom{\lfloor t \rfloor}{n},$$

let $E_{i,J}$ denote the event that column i is covered by the set J of d other columns. Any event $E_{i_1,J_1}$ is independent from $E_{i_2,J_2}$ whenever $(J_1 \cup \{i_1\}) \cup (J_2 \cup \{i_2\}) = \emptyset$, and the number of events μ that violate this condition is given by $$\mu = (d+1)\left[\binom{n}{d+1} - \binom{n-d-1}{d+1}\right]$$

All we then need to do is find the smallest t for which, with an optimal choice of w, condition (8) is satisfied using p as given in (7). That is, find a t such that $$e \cdot R_d(t, w, o)\binom{t}{w}^{-d}(\mu + 1) \leq 1$$

The results obtained by this method are given in row (f) in Table 3. We omit similar results obtained using a Bernoulli model, or the q-ary construction, since they give larger values of t.

Random selection with post processing. A third approach to generating d-disjunct matrices is to start with a t×m matrix with m≥n, drawn from a certain random ensemble, and randomly mark for deletion one of each pair of columns whose overlap is too large. Whenever the expected number of columns marked for deletion is strictly less than n−m+1 we can be sure that a d-disjunct t×n matrix exists and can be generated using this approach. (Note that some of the approaches described in the previous paragraph are a special case of this with m=n.) A variation on this approach is to pick a column and mark it for deletion if there exist any other d columns that cover it. Starting with this latter approach for the Bernoulli model with β=1/(d+1), a bound on the probability of a column being marked is found by applying a union bound to (5):

$$P(\text{cover}) \leq \binom{m-1}{d}\left(1 - \frac{d^d}{(d+1)^{d+1}}\right)^t$$

The expected number of columns marked is then bounded by $$E(\# \text{ cols}) = m \cdot P(\text{covered}) \leq m\binom{m-1}{d}\left(1 - \frac{d^d}{(d+1)^{d+1}}\right)^t,$$

and the smallest t for which the left-hand side of this inequality is strictly less than m−n+1 is given in row (g) of Table 3. A similar derivation based on constraints on the pairwise overlap of columns can easily be seen to yield $$E(\# \text{ columns marked}) \leq \binom{m}{2}\binom{t}{w}^{-1}\sum_{i=\lceil w/d\rceil}^{w}\binom{w}{i}\binom{t-w}{w-i},$$

which leads to the results shown in row (h). The best results for $T_D(n, d)$ based on bounds of the probabilistic method in row (i) were obtained for groupwise covering of constant weight vectors. For completeness we list in row (j) the results based on a random q-ary construction similar to the one we discussed earlier. A final method we would like to mention chooses m=n, but instead of removing marked columns, it augments the matrix with the identity matrix below all marked columns, thus fixing a (potential) violation of d-disjunctness by increasing the number of rows. The results of this method are presented in row (k).

TABLE 3

| | Bound | d | 2 | 3 | 4 | 5 | 6 | Reference and comments |
|---|---|---|---|---|---|---|---|---|
| | | | \multicolumn{5}{c}{Upper bounds (theoretical)} | |
| (a) | $T_{D_{w,\mu}}(n, d) \leq$ | | 436 | 982 | 1746 | 2729 | 3929 | Adaptation of [32] given in (3) |
| (b) | $T_{D_{w,\mu}}(n, d) \leq$ | | 94 | 237 | 443 | 711 | 1043 | [24, Proposition 2.1] with optimal w |
| (c) | $T_{D_{w,\mu}}(n, d) \leq$ | | 90 | 222 | 412 | 660 | 966 | Equation (4) with optimal w |
| (d) | $T_D(n, d) \leq$ | | 149 | 278 | 442 | 640 | 870 | Bernoulli, [21, Theorem 5] |
| (e) | $T_{D_w}(n, d) \leq$ | | 96 | 190 | 312 | 459 | 631 | Constant weight, groupwise cover |
| (f) | $T_{D_w}(n, d) \leq$ | | 76 | 163 | 279 | 422 | 590 | Constant weight, Lovász local lemma |
| (g) | $T_D(n, d) \leq$ | | 110 | 225 | 376 | 561 | 779 | Bernoulli, groupwise cover |
| (h) | $T_{D_{w,\mu}}(n, d) \leq$ | | 99 | 249 | 465 | 746 | 1094 | Constant weight, pairwise overlap |
| (i) | $T_{D_w}(n, d) \leq$ | | 71 | 154 | 265 | 402 | 565 | Constant weight, groupwise cover; see |
| (j) | $T_{D_{w,\mu}}(n, d) \leq$ | | 130 | 300 | 522 | 828 | 1178 | [45] Adaptation of [9, Algorithm 1] |
| (k) | $T_D(n, d) \leq$ | | 98 | 205 | 348 | 524 | 734 | [54, Theorem 2.6] |
| | | | \multicolumn{5}{c}{Upper bounds (instances)} | |
| (l) | $T_{D_{w,\mu}}(n, d) \leq$ | | 58 | 132 | 224 | 345 | 484 | Greedy search |
| (m) | $T_{D_w}(n, d) \leq$ | | 82 | 155 | 237 | 333 | 445 | [22, Section 2]; see Table 1 |
| (n) | $T_{D_{w,\mu}}(n, d) \leq$ | | 51 | 85 | 142 | 174 | 206 | Error-correction code based |
| | | | \multicolumn{5}{c}{Lower bounds} | |
| (o) | $T_{D_{w,\mu}}(n, d) \geq$ | | 35 | 56 | 75 | 96 | 115 | [35, Theorem 2] |
| (p) | $T_{D_{w,\mu}}(n, d) \geq$ | | 35 | 55 | 74 | 93 | 113 | [36, Equation 5] and [21, Equation 18] |
| (q) | $T_{D_w}(n, d) \geq$ | | 35 | — | — | — | — | [23, Theorem 1] |
| (r) | $T_{D_{w,\mu}}(n, d) \geq$ | | 32 | 48 | 62 | 75 | 88 | [24, Proposition 2.1] |
| (s) | $T_{D_w}(n, d) \geq$ | | 29 | 40 | 48 | 55 | 61 | [47, Lemma 3.2] |
| (t) | $T_S(n, d) \geq$ | | 23 | 33 | 43 | 53 | 62 | Information theoretical lower bound |

Remarks on the upper bounds. Even though different models may lead to the same growth rates in T(n, d), there is a substantial difference in resulting values, when numerically evaluated. The groupwise models easily outperform bounds based on pairwise comparison overlap. In addition there is a large gap between matrices with constant-weight columns, and those generated with i.i.d. Bernoulli entries, the former giving much more favorable results. The second approach given above, based on drawing fixed t×n matrices is clearly outperformed by the third approach in which a t×m matrix is screened and reduced in size by removing columns that violate disjunctness or maximum overlap conditions, even if the Lovàsz Local Lemma is used to sharpen the bounds.

Lower Bounds on T(n, d)

Most of the lower bounds listed in Table 3 are derived using the concept of a private set. Let F be a family of sets (the columns of our matrix A). Then T is a private set of $F \in \mathbf{F}$, if $T \subseteq F$, and T is not included in any of the other sets in F. For $F \in D_{w,\mu}(n, d)$ with length t, constant column weight w, and maximum overlap $\mu$, it is easily seen that, by definition, each $(\mu+1)$-subset of $F \in \mathbf{F}$ is private. The number of such private sets $$|\mathbf{F}| \cdot \binom{w}{\mu+1}$$

cannot exceed the total number of these sets, $$\binom{t}{\mu+1},$$

and therefore it follows that $$|\mathbf{F}| \le d\binom{t}{\mu+1}/\binom{w}{\mu+1}.$$

Based on this we can find the smallest t for which there are values w and $\mu$ obeying $(w-1)/\mu \ge d$, such that the right-hand side of the above inequality exceeds the desired matrix size. This gives a lower bound on the required code length and the resulting values are listed in row (p) of Table 3. A slightly better bound on the same class of matrices follows from an elegant argument disclosed by S. M. Johnson in "Improved asymptotic bounds for error-correcting codes," *IEEE Transactions on Information Theory*, 9(4):198-205, 1963, and is given in row (o).

M. Ruszinkó in "On the upper bound of the size of the r-cover-free families," *Journal of Combinatorial Theory, Series A*, 66:302-310, 1994. studies d-disjunctness in constant-weight matrices without considering maximum overlap and provides the following argument. Let $F \in D_w(n, d)$ be a family of w-subsets in [t], such that no d sets in F cover any other set. Moreover, assume that w=kd for some integer k. Any $F \in \mathbf{F}$ can be partitioned into d sets of length k, and it follows from the d-disjunctness of F that at least one of these d subsets is private to F (otherwise it would be possible to cover F with d other columns). The key observation then, is that Baranyai's Theorem [5] guarantees the existence of $$s = \binom{w}{w/d}/d$$

different partitions of F such that no subset in the partitions is repeated. Each of these s partitions contains a private set, so the total number of private sets is at least $|\mathbf{F}| \cdot s$. Rewriting this gives $$|\mathbf{F}| \le d\binom{t}{w/d}/\binom{e}{w/d}.$$

With proper rounding this can be extended to general weights w, giving the results shown in row (s). The results in rows (q) and (r) are also obtained based on private sets, but we will omit the exact arguments used here. Finally, an evaluation of the information-theoretic bound (1) is given in row (t).

Numerical Experiments

To illustrate the strength of an embodiment of the invention, we analyze the performance of some of the group-testing designs given in Table 2, when used to decode scintillation events in a PET setting.

Simulation Parameters

In PET, scintillation crystals are used to convert 511 kilo-electron volt annihilation photons into bursts of low-energy (visible light) photons. We use the standard software package to simulate this process for some 1,000 scintillation events for a 3×3×10 mm³ cerium-doped lutetium oxyorthosilicate (LSO) crystal (7.4 g/cm³, n=1.82, absorption length=50 m, scintillation yield=26,000 photons/MeV, fast time constant=40 ns, yield ratio=1, resolution scale=4.41) coupled to a 3×3×0.75 mm silicon sensor by 50µ of optical grease (n=1.5, absorption length=50 m). For each event the simulation yields the location and arrival time of the low-energy photons with respect to the start of the event.

The silicon sensor is assumed to have a 70% fill factor and a quantum efficiency of 50% for blue photons. Once a photon is detected a pixel will be unable to detect a new photon for a known dead time, simulated to lie between 10 and 80 ns. We assume that each pixel takes up the same fraction of detector area and assign photons uniformly at random to a pixel. This increases the pixel firing rate by avoiding hitting dead pixels in high flux regions, thereby making the decoding process more challenging. We do not model dark counts and cross-talk between pixels, since they would account to less than 1% of the total number of detected photons and therefore do not significantly affect the result.

In terms of pixel firings, we ignore the jitter in the time between an incident photon and the actual firing of a pixel. This assumption greatly simplifies the simulation, and is not expected to have any significant influence on the results. The signal delays over the interconnection network between pixels and TDCs are assumed to be uniform, i.e., the travel time of the signal from each pixel to any connected TDC is assumed to be the identical, and can therefore be set to zero without loss of generality. TDCs are further assumed to be ideal in the sense that they have no down time; a time stamp is recorded whenever an event occurred during the sampling interval.

Decoding

Group testing also provides methods for decoding the encoded signals to determine the pixel firings. Pixel firings give rise to specific patterns of TDC recordings through the group-testing design embedded in the interconnection network. These patterns can be decoded by considering the time stamps recorded in the memory buffer associated with each TDC and forming a binary test vector for each time interval. Given a test vector y, the decoding process starts by identifying all codewords $a_i$ that are covered by y. When the group testing matrix A is a d-disjunct matrix, it immediately follows that whenever there are no more than d simultaneous firings, only the codewords corresponding to those pixels will be selected, and the decoding is successful. Whenever there are s>d pixels that fired simultaneously, many more than s columns may be covered by y. At this point we use two possible decoding methods. The first is a groupwise method in which we return all feasible columns whenever none of them can be omitted to form y, or nothing otherwise. The second scheme, based on individual decoding, returns all columns that have a one in a position where all other feasible columns have a zero (and therefore cannot be omitted). We recover the pixels that fired when decoding of the corresponding column is successful, otherwise they are missed.

Results

In our simulations in this embodiment of the invention, we considered sensors with both 60×60 and 120×120 pixel arrays, and a variety of different pixel dead times and TDC interval lengths. A sufficient number of tables that are representative of the results are shown to provide understanding of the embodiment of the inventions. Table 4 shows the simulation results obtained using 60×60 and 120×120 arrays with interconnection networks based on the superimposed codes from Table 2, with disjunctness ranging from 2 to 6 by showing decoding statistics for two pixel arrays using a pixel dead time of 20 ns and TDC interval length of 40 ps. Results shown correspond to the decoding of 1,000 sequential scintillation events. These times are somewhat pessimistic; the typical dead time is longer, while the TDC interval could be shorter. Both choices cause an increase in the number of simultaneous photons per TDC sampling window, thereby making recovery more challenging. In particular, note that the maximum number of simultaneous firings reaches 14, far above the guaranteed recovery level. Nevertheless, it can be seen that even with a 4-disjunct interconnection network, more than 99% of all pixel firings are successfully recovered. For the 120×120 array, this number is slightly lower at 98.5% since fewer photons hit dead pixels, thus causing an increase in the number of firings and, consequently, an increase in the number of simultaneous hits.

TABLE 4

| #Sim. | #Events | Disjunctness (#TDCs) | | | | |
|---|---|---|---|---|---|---|
| | | d = 2 (51) | d = 3 (85) | d = 4 (142) | d = 5 (174) | d = 6 (206) |
| | | Decoded events (%) | | | | |
| 1 | 1,021,073 | 100.000 | 100.000 | 100.000 | 100.000 | 100.000 |
| 2 | 419,174 | 100.000 | 100.000 | 100.000 | 100.000 | 100.000 |
| 3 | 192,232 | 44.015 | 100.000 | 100.000 | 100.000 | 100.000 |
| 4 | 87,389 | 2.289 | 89.808 | 100.000 | 100.000 | 100.000 |
| 5 | 38,526 | 0.026 | 44.271 | 99.574 | 100.000 | 100.000 |
| 6 | 16,126 | 0.000 | 7.590 | 96.366 | 99.895 | 100.000 |
| 7 | 6,186 | 0.000 | 0.404 | 84.481 | 99.208 | 100.000 |
| 8 | 2,216 | 0.000 | 0.000 | 59.206 | 94.540 | 99.549 |
| 9 | 725 | 0.000 | 0.000 | 27.448 | 83.586 | 97.793 |
| 10 | 231 | 0.000 | 0.000 | 7.792 | 59.307 | 91.342 |
| 11 | 70 | 0.000 | 0.000 | 1.429 | 30.000 | 71.429 |
| 12 | 17 | 0.000 | 0.000 | 0.000 | 5.882 | 70.588 |
| 13 | 6 | 0.000 | 0.000 | 0.000 | 0.000 | 0.000 |
| 14 | 1 | 0.000 | 0.000 | 0.000 | 0.000 | 100.000 |

TABLE 4-continued

| #Pixel firings | Pixel firings missed (%) | | | | |
|---|---|---|---|---|---|
| 3,145,990 | 32.571 | 9.636 | 0.833 | 0.135 | 0.025 |
| (a) 60 × 60 pixel array | | | | | |

| #Sim. | #Events | Disjunctness (#TDCs) | | | | |
|---|---|---|---|---|---|---|
| | | d = 2 (63) | d = 3 (110) | d = 4 (161) | d = 5 (233) | d = 6 (323) |
| | | Decoded events (%) | | | | |
| 1 | 992,945 | 100.000 | 100.000 | 100.000 | 100.000 | 100.000 |
| 2 | 444,448 | 100.000 | 100.000 | 100.000 | 100.000 | 100.000 |
| 3 | 230,712 | 16.390 | 100.000 | 100.000 | 100.000 | 100.000 |
| 4 | 118,381 | 0.091 | 95.275 | 100.000 | 100.000 | 100.000 |
| 5 | 56,684 | 0.000 | 62.900 | 99.737 | 100.000 | 100.000 |
| 6 | 25,215 | 0.000 | 15.435 | 96.764 | 99.996 | 100.000 |
| 7 | 10,061 | 0.000 | 1.312 | 80.698 | 99.901 | 100.000 |
| 8 | 3,711 | 0.000 | 0.054 | 43.897 | 99.111 | 100.000 |
| 9 | 1,224 | 0.000 | 0.000 | 12.582 | 95.997 | 99.918 |
| 10 | 421 | 0.000 | 0.000 | 1.663 | 83.610 | 99.525 |
| 11 | 115 | 0.000 | 0.000 | 0.000 | 56.522 | 99.130 |
| 12 | 33 | 0.000 | 0.000 | 0.000 | 27.273 | 100.000 |
| 13 | 8 | 0.000 | 0.000 | 0.000 | 12.500 | 100.000 |
| 14 | 3 | 0.000 | 0.000 | 0.000 | 0.000 | 100.000 |

| #Pixel firings | Pixel firings missed (%) | | | | |
|---|---|---|---|---|---|
| 3,599,359 | 44.554 | 10.326 | 1.430 | 0.068 | 0.001 |
| (b) 120 × 120 pixel array | | | | | |

A more complete picture on the relationship between the number of pixel firings missed and the pixel dead time and TDC interval length is given in Table 5. Shown are the percentage of pixel firings missed with individual decoding for various pixel dead times and TDC interval lengths. Results shown correspond to the decoding of 1,000 sequential scintillation events. The first three columns show the dead time (and total number of pixel firings), TDC time interval, and maximum number of simultaneous hits, respectively. As expected, smaller TDC intervals reduce the number of simultaneous hits and therefore lead to more uniquely decodable events.

TABLE 5

| Dead time (#firings) | TDC interval | #Simult. | Pixel firings missed (%) | | | | |
|---|---|---|---|---|---|---|---|
| | | | d = 2 | d = 3 | d = 4 | d = 5 | d = 6 |
| 10 ns (3.4 m) | 5 ps | 6 | 0.23 | 0.00 | 0.00 | 0.00 | 0.00 |
| | 10 ps | 7 | 1.22 | 0.01 | 0.00 | 0.00 | 0.00 |
| | 20 ps | 11 | 5.80 | 0.18 | 0.00 | 0.00 | 0.00 |
| | 40 ps | 14 | 21.02 | 2.52 | 0.01 | 0.00 | 0.00 |
| 20 ns (3.1 m) | 5 ps | 6 | 0.21 | 0.00 | 0.00 | 0.00 | 0.00 |
| | 10 ps | 7 | 1.13 | 0.01 | 0.00 | 0.00 | 0.00 |
| | 20 ps | 11 | 5.33 | 0.17 | 0.00 | 0.00 | 0.00 |
| | 40 ps | 14 | 19.15 | 2.38 | 0.01 | 0.00 | 0.00 |
| 40 ns (2.8 m) | 5 ps | 6 | 0.22 | 0.00 | 0.00 | 0.00 | 0.00 |
| | 10 ps | 7 | 1.16 | 0.01 | 0.00 | 0.00 | 0.00 |
| | 20 ps | 11 | 5.46 | 0.19 | 0.00 | 0.00 | 0.00 |
| | 40 ps | 14 | 19.14 | 2.57 | 0.01 | 0.00 | 0.00 |
| 80 ns (2.5 m) | 5 ps | 6 | 0.24 | 0.00 | 0.00 | 0.00 | 0.00 |
| | 10 ps | 7 | 1.28 | 0.01 | 0.00 | 0.00 | 0.00 |
| | 20 ps | 11 | 6.03 | 0.21 | 0.00 | 0.00 | 0.00 |
| | 40 ps | 14 | 20.98 | 2.87 | 0.01 | 0.00 | 0.00 |
| (a) 60 × 60 pixel grid | | | | | | | |
| 10 ns (3.7 m) | 5 ps | 6 | 1.20 | 0.00 | 0.00 | 0.00 | 0.00 |
| | 10 ps | 8 | 4.45 | 0.00 | 0.00 | 0.00 | 0.00 |
| | 20 ps | 12 | 14.47 | 0.10 | 0.00 | 0.00 | 0.00 |
| | 40 ps | 14 | 36.58 | 2.05 | 0.06 | 0.00 | 0.00 |
| 20 ns (3.6 m) | 5 ps | 6 | 1.17 | 0.00 | 0.00 | 0.00 | 0.00 |
| | 10 ps | 8 | 4.34 | 0.00 | 0.00 | 0.00 | 0.00 |

TABLE 5-continued

| Dead time (#firings) | TDC interval | #Simult. | Pixel firings missed (%) | | | | |
|---|---|---|---|---|---|---|---|
| | | | d = 2 | d = 3 | d = 4 | d = 5 | d = 6 |
| | 20 ps | 12 | 14.10 | 0.10 | 0.00 | 0.00 | 0.00 |
| | 40 ps | 14 | 35.71 | 2.00 | 0.06 | 0.00 | 0.00 |
| 40 ns (3.5 m) | 5 ps | 6 | 1.17 | 0.00 | 0.00 | 0.00 | 0.00 |
| | 10 ps | 8 | 4.33 | 0.00 | 0.00 | 0.00 | 0.00 |
| | 20 ps | 12 | 14.02 | 0.10 | 0.00 | 0.00 | 0.00 |
| | 40 ps | 14 | 35.29 | 2.03 | 0.06 | 0.00 | 0.00 |
| 80 ns (3.4 m) | 5 ps | 6 | 1.19 | 0.00 | 0.00 | 0.00 | 0.00 |
| | 10 ps | 8 | 4.42 | 0.00 | 0.00 | 0.00 | 0.00 |
| | 20 ps | 12 | 14.29 | 0.11 | 0.00 | 0.00 | 0.00 |
| | 40 ps | 14 | 35.84 | 2.10 | 0.07 | 0.00 | 0.00 |

(b) 120 × 120 pixel grid

Figure 3:
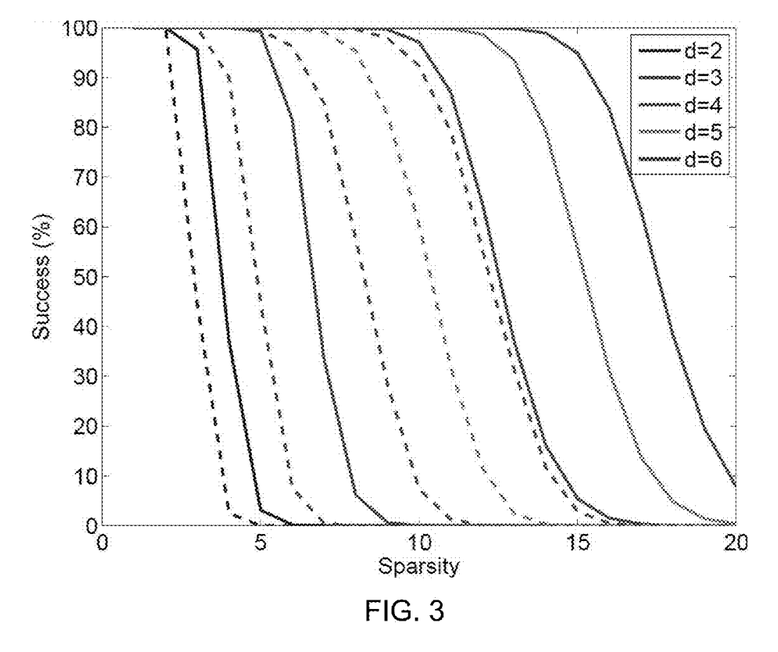
FIG. 3 shows success rates for each sparsity level.

As seen, even when the number of simultaneous pixel firings exceeds the disjunctness of the group-testing design, it often remains possible to uniquely decode the resulting codeword, or at least a large fraction of the pixels included. To get more accurate statistics, we studied the decoding properties of randomly generated sparse vectors (corresponding to random pixel firing patterns) with the number of nonzero entries ranging from 1 to 20. For each sparsity level we decoded 10,000 vectors and summarize the success rates in FIG. 3. The plots show that recovery breaks down only gradually once the sparsity exceeds the disjunctness level of the matrix. Moreover, the plot shows that individual recovery (solid lines) far exceeds the success rate of groupwise decoding (dashed lines).

Discussion

For the adaptation of the group-testing based design in practical designs, a number of additional issues needs to be addressed. We discuss some of the major ones below.

Decoding. Since the TDCs store time stamps in a memory buffer, an embodiment of the invention performs the decoding process off-line. This is analogous to the operation of a digital storage oscilloscope. Aside from the obvious benefit of reducing the amount of circuitry, it has the advantage that we have a global view of the entire data, not just the current event, or a short history of previous events. This data can be used to extract more information from unsuccessfully decoded events by excluding columns corresponding to pixels that fired shortly before or after the current event, or by using more sophisticated, but perhaps combinatorial decoding techniques.

Asynchronicity of the system. One challenge in the implementation of the proposed design is to make sure that the TDCs connected to a single pixel all record the firing of that pixel in the same TDC interval. In other words, it is important that codewords are recorded in a single interval and not spread out over two consecutive intervals. Such a shift can occur due to differences of travel times of signals between the pixel and the TDCs as a result of differences in wiring lengths. The appearance of partial codewords in test vectors complicates decoding and may cause pixel firings to be masked by others and be missed completely with no means of detection.

There are two main approaches of dealing with this problem according to different embodiments of the invention. One embodiment synchronizes the logical signal generated by the pixel using a global clock across the chip to ensure uniform arrival of signals to the TDC digitizers. Such an approach has been successfully implemented in clock design trees of CPU chips that maintain clock skews less than the TDC sampling frequency. The second embodiment considers bursts of consecutive events and decodes the union of the corresponding test vectors as a whole. This also leads to an increase in the expected number of simultaneous firings as well as a slight decrease in temporal resolution. This approach is possible only when the photon flux is sufficiently low; when many consecutive TDC windows contain events, their union simply contains too many pixel firings to be successfully decoded.

Figure 4:
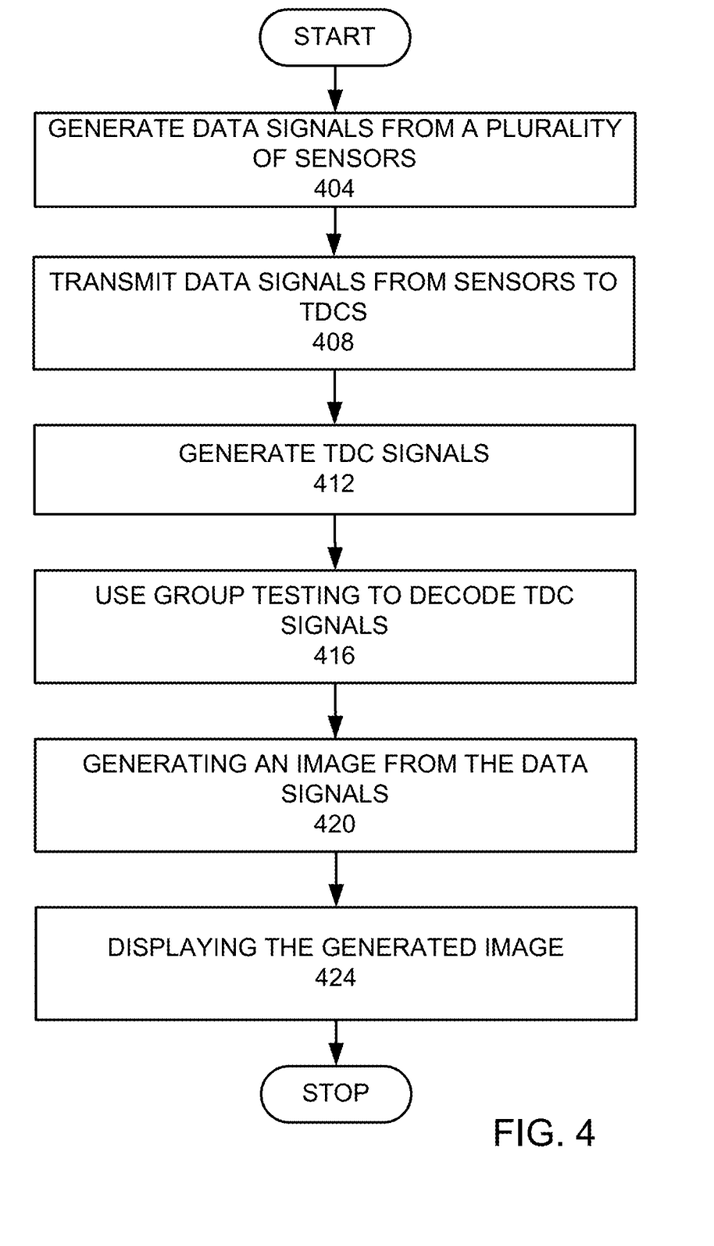
FIG. 4 is a flow chart of an embodiment of the invention.

To facilitate the understanding of the invention, FIG. 4 is a high level flow chart of an embodiment of the invention. Data signals are generated by a plurality of sensors (step 404). The data signals are transmitted from the sensors to the TDCs (step 408). TDC signals are generated (step 412). Group testing is used to decode the TDC signals based on a binary matrix to determine which sensors of the plurality of sensors generated data signals (step 416). An example of a binary matrix is illustrated as matrix A in the above section "Matrix representation and guarantees." An example of a decoding process using the binary matrix is described in the "Decoding" section above. An image is generated from the data signals (step 420). The generated image is displayed (step 424).

Figure 5:
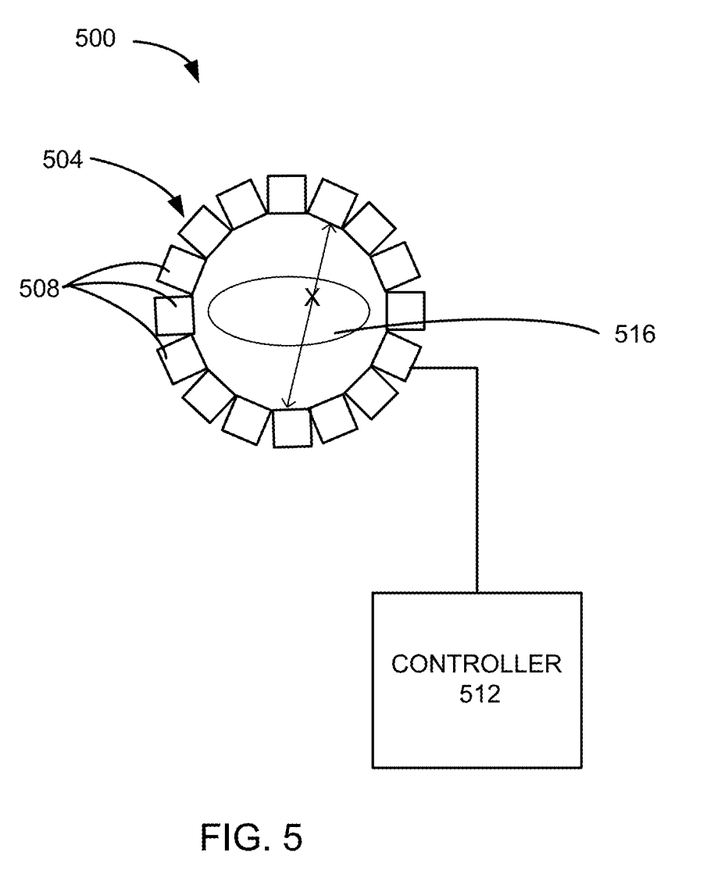
FIG. 5 is a schematic of a PET system that may be used in an embodiment of the invention.

FIG. 5 is a schematic view of a PET system 500 that may be used in an embodiment of the invention. The PET system 500 comprises a detector ring 504 and a controller 512. The detector ring 504 comprises a plurality of detectors 508 formed in a ring. An object 508 is placed in an aperture of the detector ring 504. A positron emission at point X creates two gamma photons, which are detected by different detectors 508 of the detector ring 504. The event is recorded by the controller 512. In order to detect the gamma photons at the detectors 508 at least one photo detector is placed adjacent to each detector 508. FIG. 1c illustrates a plurality of photo detectors 104. Each photo detector 104 is electrically connected to one or more time-to-digital converter (TDC) 108. Although there are nine photo detectors 104 and only four TDCs 108, the use of group testing allows the determination of which photo detector 104 detected a photon. The group testing provides that at least two photo detectors of the plurality of photo detectors 104 as simultaneously and uniquely decoded. The group testing may be applied by the controller 512.

Figure 6:
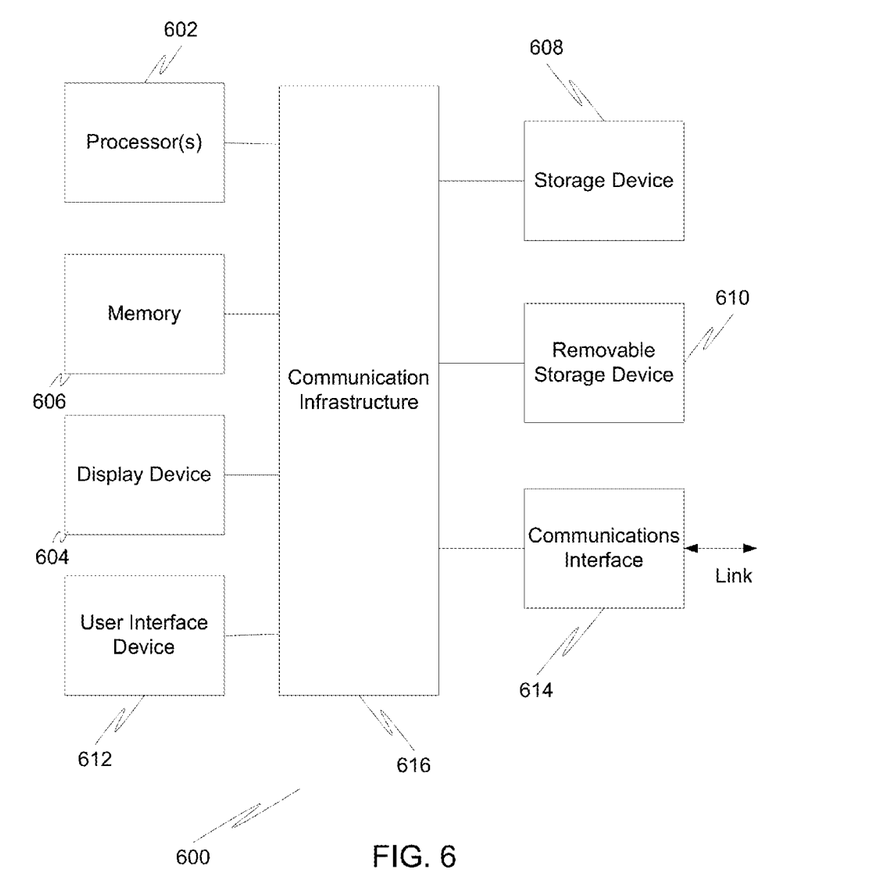
FIG. 6 illustrates a computer system that may be used in an embodiment of the invention.

FIG. 6 is a high level block diagram showing a computer system 600, which may be used to provide the controller 512. The computer system may have many physical forms ranging from an integrated circuit, a printed circuit board, and a small handheld device up to a computer. The computer system 600 includes one or more processors 602, and further can include an electronic display device 604, a main memory 606 (e.g., random access memory (RAM)), storage device 608 (e.g., hard disk drive), removable storage device 610 (e.g., optical disk drive), user interface devices 612 (e.g., keyboards, touch screens, keypads, mice or other pointing devices, etc.), and a communication interface 614 (e.g., wireless network interface). The communication interface 614 allows software and data to be transferred between the computer system 600 and external devices via a link. The system may also include a communications infrastructure 616 (e.g., a communications bus, cross-over bar, or network) to which the aforementioned devices/modules are connected. The generated image may be displayed on the display device 604 (step 424).

Information transferred via communications interface 614 may be in the form of signals such as electronic, electromagnetic, optical, or other signals capable of being received by communications interface 614, via a communication link that carries signals and may be implemented using wire or cable, fiber optics, a phone line, a cellular phone link, a radio frequency link, and/or other communication channels. With such a communications interface, it is contemplated that the one or more processors 602 might receive information from a network, or might output information to the network in the course of performing the above-described method steps. Furthermore, method embodiments of the present invention may execute solely upon the processors or may execute over a network such as the Internet in conjunction with remote processors that shares a portion of the processing.

The term "non-transient computer readable medium" is used generally to refer to media such as main memory, secondary memory, removable storage, and storage devices, such as hard disks, flash memory, disk drive memory, CD-ROM and other forms of persistent memory and shall not be construed to cover transitory subject matter, such as carrier waves or signals. Examples of computer code include machine code, such as produced by a compiler, and files containing higher level code that are executed by a computer using an interpreter. Computer readable media may also be computer code transmitted by a computer data signal embodied in a carrier wave and representing a sequence of instructions that are executable by a processor.

In one embodiment, the plurality of photo detectors 104 may be arranged in an m×n array, where m and n are whole numbers greater than 1 and the number of TDC's 108 is less than m+n. Preferably, in this embodiment n≠n. In another embodiment, the plurality of photo detectors 104 may be arranged in an n×n array, where n is a whole number greater than 1 and where the number of TDC's is $ceil(log_2(n^2+1))$ where ceil(x) is the smallest integer greater than or equal to x. In another embodiment, at least six photo detectors 104 are provided, where each photo detector is simultaneously and uniquely decoded. In another embodiment, the plurality of photo detectors 104 sense a sparse signal. Preferably the sparse signal is sparse in both space and time. Preferably, the group testing is a non-adaptive group testing. In other embodiments the photodetectors may be replaced by other types of sensors to record other detected events.

Figure 7:
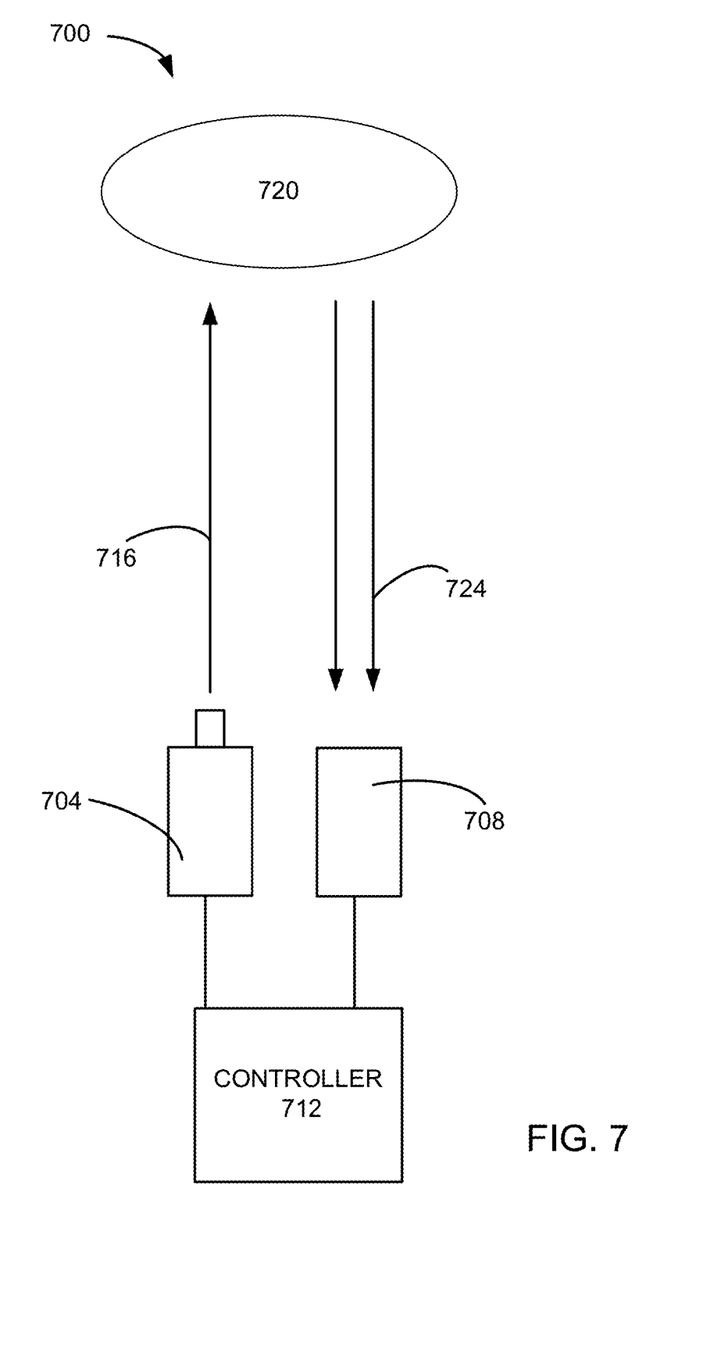
FIG. 7 is a schematic view of a LiDAR system, which may be used in another embodiment of the invention.

FIG. 7 is a schematic view of a Light Detection And Ranging (LiDAR) system 700 that may be used in another embodiment of the invention. The LiDAR system 700 comprises a laser source 704, a camera 708 with a plurality of photodetectors, and a controller 712. The laser source 704 provides a laser light 716 to scan an object 720. Light 724 is reflected from the object 720 and detected by at least one of a plurality of photodetectors in the camera 708. The detection event is recorded by the controller 712. In this embodiment, as described above in a previous embodiment. Each photodetector of the plurality of photodetectors is electrically connected to one or more time-to-digital converter (TDC). The use of group testing allows the determination of which photodetector of the plurality of photodetectors detected a photon. The group testing may be applied by the controller 712.

While this invention has been described in terms of several preferred embodiments, there are alterations, permutations, modifications and various substitute equivalents, which fall within the scope of this invention. It should also be noted that there are many alternative ways of implementing the methods and apparatuses of the present invention. It is therefore intended that the following appended claims be interpreted as including all such alterations, permutations, modifications, and various substitute equivalents as fall within the true spirit and scope of the present invention.

What is claimed is:

1. A method for providing an image from a device with a plurality of sensors and a plurality of time to digital converters (TDC) comprising:
   generating data signals from some of the plurality of sensors, wherein each sensor of the plurality of sensors provides output in parallel to more than one TDC of the plurality of TDCs and wherein each TDC of the plurality of TDCs receives in parallel input from more than one sensor of the plurality of sensors, wherein a binary matrix indicates which sensors are connected to which TDC;
   transmitting the data signals from the sensors to the TDCs;
   generating TDC signals from the data signals; and
   using group testing to decode the TDC signals based on the binary matrix.

2. The method, as recited in claim 1, wherein at least two sensors of the plurality of sensors are simultaneously and uniquely decoded.

3. The method, as recited in claim 2, wherein the plurality of sensors are formed into an m×n array, wherein n and m are whole numbers greater than 1, and wherein the number of TDC's is less than m+n.

4. The method, as recited in claim 1, wherein the plurality of sensors are formed into an n×n array, wherein n is a whole number greater than 1, and wherein the number of TDCs is $ceil(log_2(n^2+1))$, wherein ceil(x) is the smallest integer greater than or equal to x.

5. The method, as recited in claim 1, wherein at least six sensors of the plurality of sensors are simultaneously and uniquely decoded.

6. The method, as recited in claim 1, wherein the plurality of sensors sense a sparse signal, which is sparse in both space and time.

7. The method, as recited in claim 1, wherein the group testing is non-adaptive group testing.

8. The method, as recited in claim 1, further comprising generating an image based on the data signals.

9. The method as recited in claim 8, further comprising displaying the generated image.

10. The method, as recited in claim 9, wherein the device is a PET device.

11. The method, as recited in claim 9, wherein the device is a LiDAR device.

12. The method, as recited in claim 9, wherein the plurality of sensor are a plurality of photodetectors.

13. An apparatus, comprising:
    a plurality of sensors in an m×n array where m and n are whole numbers greater than 1;
    a plurality of time to digital converters (TDC), wherein there are less than m+n TDC's, and where each TDC is connected in parallel to receive a signal from more than one sensor of the plurality of sensor and wherein more than one TDC receives a signal from each sensor of the plurality of sensors; and
    a controller electrically connected to each TDC of the plurality of TDC's, wherein the controller comprises:
      at least one processor; and
      computer readable media, comprising computer readable code for using group testing to determine which sensor of the plurality of sensors provided a signal.

14. The apparatus, as recited in claim 13, wherein the plurality of sensors senses a sparse signal, which is sparse in both space and time.

15. The apparatus, as recited in claim 13, wherein the group testing is non-adaptive group testing.

16. The apparatus, as recited in claim 13, further comprising computer readable code for generating an image based on the data signals.

17. The apparatus, as recited in claim 13, further comprising:
    a display; and
    computer readable code for displaying the generated image on the display.

18. The apparatus, as recited in claim 13, wherein the plurality of sensors form a camera in a LiDAR system, which further comprises a laser source.

19. The apparatus, as recited in claim 13, wherein the plurality of sensors forms a detector ring in a PET system.

* * * * *